April 7, 1959 — E. H. BLATTNER — 2,880,888
DRAFT RIGGING

Filed Nov. 8, 1956 — 3 Sheets-Sheet 1

Inventor:
Emil H. Blattner
By Wilmer Mechlin
his Attorney

April 7, 1959     E. H. BLATTNER     2,880,888

DRAFT RIGGING

Filed Nov. 8, 1956     3 Sheets-Sheet 2

Inventor:
Emil H. Blattner
By Wilmer Mechlin
his Attorney

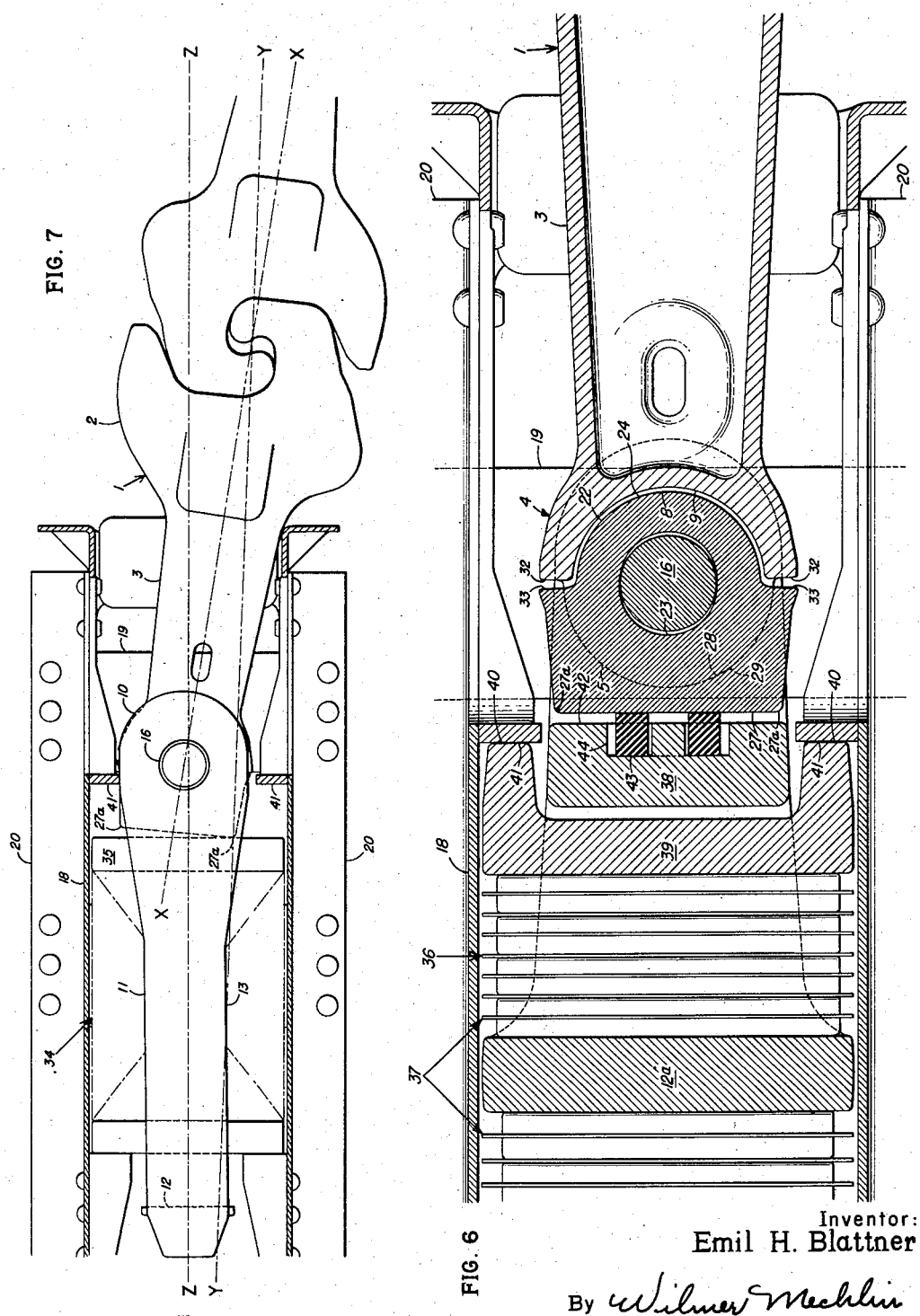

United States Patent Office 2,880,888
Patented Apr. 7, 1959

2,880,888
DRAFT RIGGING

Emil H. Blattner, Williamsville, N.Y., assignor, by mesne assignments, to Symington Wayne Corporation, a corporation of Maryland Application November 8, 1956, Serial No. 621,155

13 Claims. (Cl. 213—64)

This invention relates to draft rigging and has for its primary object the provision of an improved draft rigging whereby a swiveling coupler is enabled through energization of an associated cushioning means to counteract the high lateral force component and consequent tendency to derail to which long cars, such as those contemplated for "trailer-on-flatcar" or "piggyback" service are subject with conventional swivel couplers on negotiating sharp yard curves.

Another object of the invention is to provide an improved draft rigging wherein a coupler swivelly connected to a yoke swivels freely over the midportion of its range of lateral movement and thereupon is restrained by means swivelly connected to and then moving in unison with the coupler to energize an associated cushioning means.

An additional object of the invention is to provide an improved draft rigging wherein a coupler swivelly connected to a yoke is also swivelly connected by the same connecting pin to a swiveling block, the coupler swiveling freely relative to the block over a portion of its range of lateral movement and thereafter moving in unison with the block to energize through the latter, an associated cushioning means, thereby creating a force tending to center the coupler and counteracting the lateral force component developed in buff when coupled cars angle relative to each other, as in rounding sharp yard curves.

Figure 1:
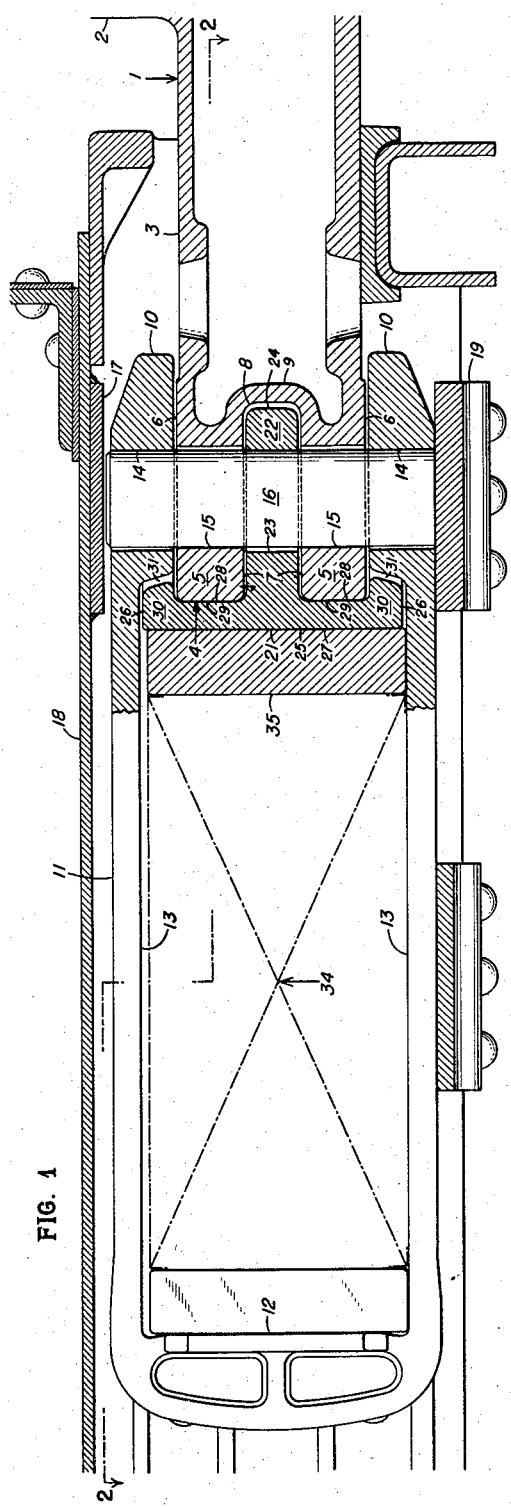
Figure 2:
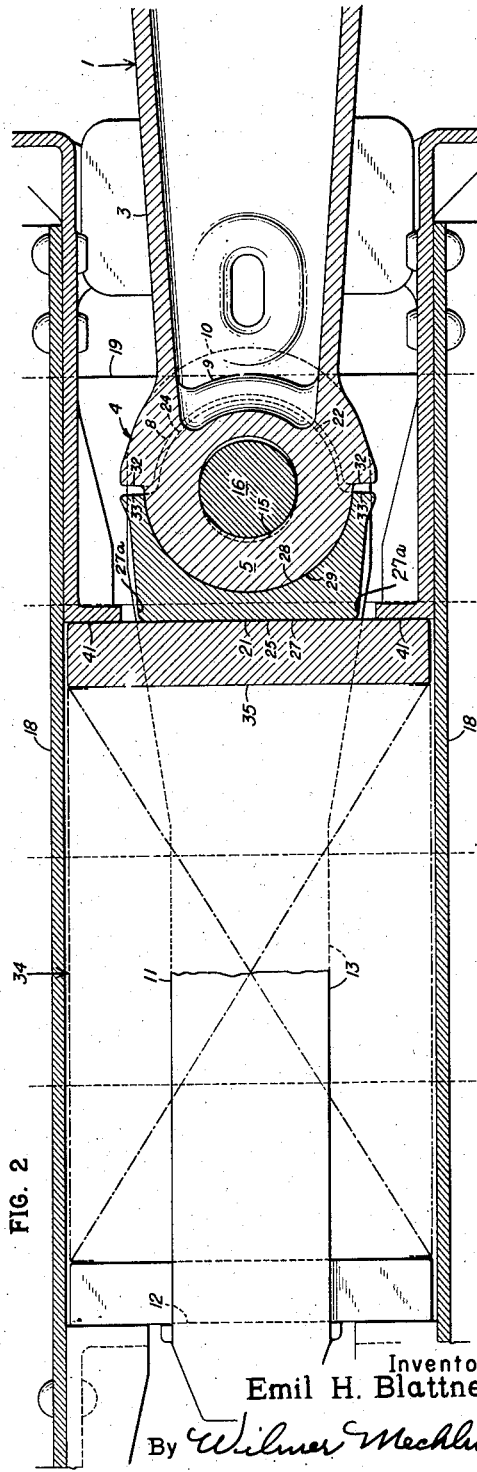
Figure 3:
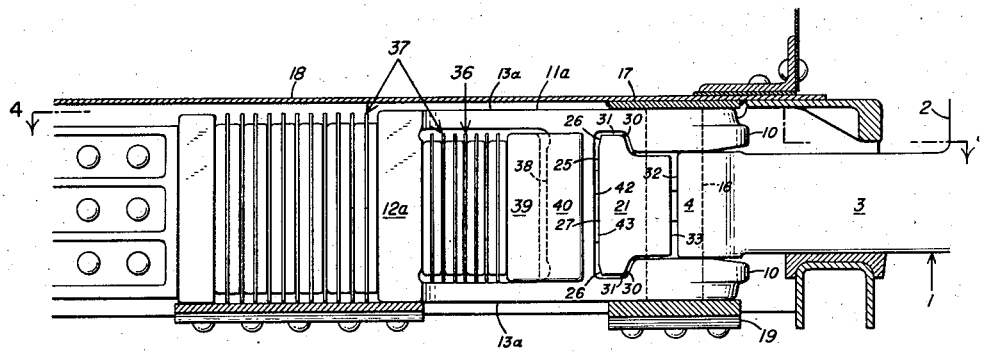
Figure 4:
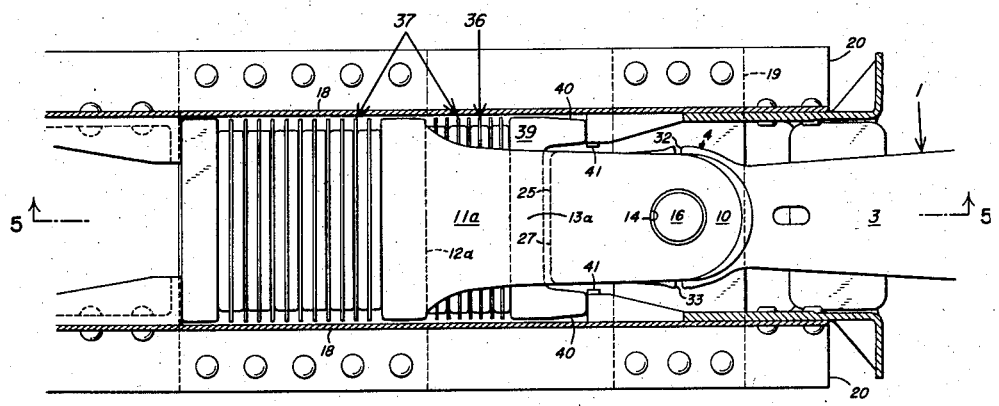
Figure 5:
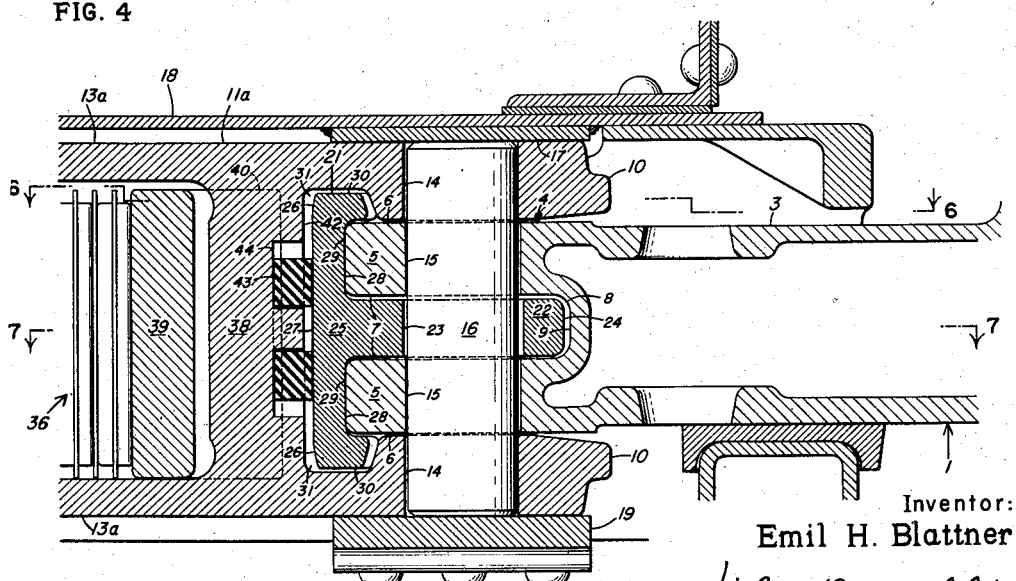

Other objects and advantages of the invention will appear hereinafter in the detailed description, be particularly pointed out in the appended claims and be illustrated in the accompanying drawings, in which:

Figure 1 is a longitudinal central sectional view of an embodiment of the draft rigging of the present invention, Figure 2 is a horizontal sectional view taken along the lines 2—2 of Figure 1, Figure 3 is a side elevational view on a reduced scale of a second embodiment of the draft rigging of the present invention, Figure 4 is a horizontal sectional view taken along the lines 4—4 of Figure 3, Figure 5 is a fragmentary vertical sectional view on an enlarged scale taken along the lines 5—5 of Figure 5, Figure 6 is a horizontal sectional view taken along the lines 6—6 of Figure 5 with the coupler and associated parts in normal position, and Figure 7 is a plan view on a reduced scale of the embodiment of Figure 1 with the coupler at one of its limits of lateral angling, a portion being broken away and shown in section to more clearly illustrate certain of the details of construction.

Referring now in detail to the drawings, in which like reference characters designate like parts, the improved draft rigging of the present invention is adapted to replace the conventional swivelly-connected coupler and yoke, whether the yoke is of the standard or twin cushion draft gear type and, while affording the same range of relative lateral movement of the coupler as does the conventional arrangement, yieldably resists such movement over its outer limits by energizing an associated cushioning means. While both contain the same basic concept, two embodiments of the invention have been illustrated, one employing a yoke designed to pocket the usual single unit draft gear and the other a yoke for use with a twin cushion draft gear.

Referring first to the embodiment of Figures 1 and 2, the draft rigging there disclosed is comprised of a coupler 1 having a head 2 of the non-interlocking type such as found on the A.A.R. Standard Type "E" coupler. The shank 3 of the coupler 1 ends rearwardly in a bifurcated butt 4 providing a pair of vertically spaced hinge loops 5 having substantially parallel and planar outer and inner vertically directed faces 6 and 7, respectively, the inner 7 of which define the vertical limits of a pocket or socket 8 terminating forwardly in an arcuately and preferably cylindrically concave rearwardly facing wall 9. Embracing and spaced vertically by the hinge loops 5 of the butt 4 of the coupler 1 are jaws 10, integral with and forming the forward extremities of a pair of vertically spaced, longitudinally extending arms or straps of a so-called vertical yoke 11, the latter terminating rearwardly in a vertically directed rear web or wall 12 extending between and connecting the rear ends of the arms 13.

Extending through vertically aligned pin holes or openings 14 and 15 in the jaws 10 and hinge loops 5, respectively, and swivelling or pivotally connecting the coupler 1 and yoke 11 is a preferably cylindrical pivot or connecting pin 16 which, when in connecting position, may be held against axial dislodgment at its upper end by a top plate 17 fixed, as by welding, to the top of the center sills 18 and a cross tie or tie plate 19 riveted or otherwise fixed to the bottom flanges 20 of the center sills. The pin 16 also serves to swivelly or pivotally connect the coupler to a swivel block or butt casting 21 which in effect forms with the shank 3 a two-part stem for the coupler and has a tongue 22 received or fitting within the pocket or socket 8 between the hinge loops 5 and pierced by a pin hole or opening 23 through which the pivot pin 16 projects. The tongue terminates forwardly in an arcuately convex and preferably convexly cylindrical front wall 4 substantially coradial with the pivot pin 16 and confronting and desirably spaced slightly from the correspondingly curved front wall 9 of the pocket 8.

The swivel block 21 is substantially T-shaped in vertical section, being provided at the rear of the tongue 22 with a head 25 formed by a pair of vertically directed flange portions 26, one extending above and the other below the tongue 22 and the two together vertically overlapping the hinge loops 5. The head 25 has a substantially flat or planar rear face 27 and on each of its flange portions 26 is an arcuately and preferably cylindrically concave forwardly facing bearing surface 28, each of which confronts an arcuately and preferably cylindrically convex bearing face on the rear end of one of the hinge loops 5. These several bearing surfaces and faces 28 and 29 are coaxial with the pivot pin 16 and are coradial with each other, having a common radius, so as to have surface contact and slide, one on the other, as the coupler 1 angles laterally relative to the swivel block 21. As will be noted, the flange portions 26 end outwardly in forwardly directed skirts or flanges 30 which extend partly around and bound the intermediate portions of the bearing surfaces 28 and overlap and embrace the outer faces 6 of the hinge loops 5, the flanges 30 in turn being received in inwardly facing grooves 31 of similar configuration in the jaws 10 of the yoke.

The free lateral angling, swiveling or pivoting of the coupler 1 relative to the swivel block 21 is intended to be limited so that beyond predetermined limits the coupler and block will angle in unison or concert. This is accomplished by providing at opposite sides of the butt 4 of the coupler, at or adjacent the ends of the cylindrical forward wall 9 of the pocket 8, a pair of stop shoulders or abutments 32 and at opposite sides of the swivel block 21, at or adjacent the opposite ends of the cylindrical bearing surfaces 28, a second pair of shoulders or abutments 33, the confronting of the shoulders 32 and 33 on the coupler and block, respectively, normally being spaced from and angularly disposed relative to each other. These several shoulders preferably extend substantially radially of the pivot pin 16 and are flat or planar so that those at either side have full bearing at one or the other limits of relative movement of the coupler and block. In the disclosed embodiments, the shoulders 32 on the coupler are angled forwardly and those 33 on the block are angled rearwardly of a plane through the axis of the pivot pin 16 and normal to a longitudinal center line of the coupler when the latter is in its normal or midposition, the illustrated included angle between the shoulders at either side being about 4°.

It has been mentioned that the rear face 27 of the head 25 of the swivel block 21 is substantially flat. This face bears or reacts against a cushioning or yieldable means which, in the embodiment of Figures 1 and 2, is in the form of a draft gear, indicated at 34, contained by the yoke 11, the swivel block bearing against the draft gear either directly or, and more usually, through an interposed front follower 35. When the coupler in angling laterally reaches the limits of its free movement relative to the swivel block 21 as determined by the shoulders 32 and 33, the swivel block thereafter angles in unison with the coupler and cants or angles about one of its rear corners 27a relative to the front follower 35. This, in turn, causes the draft gear 34 to be compressed or energized so as to exert a force resisting angling in unison of the coupler and block and tending to restore the coupler to centered position. At the same time, the longitudinal force responsible for the angling, the center line of which during free angling of the coupler passes through the coupler's pivotal axis, is shifted laterally in the direction of angling so that its center line now passes through one of the rear corners 27a about which the swivel block 25 is canting relative to the front follower 35. This lateral shift of the longitudinal force is shown in Figure 7, wherein the line X—X denotes the center line of the force during free angling of the coupler, while the line Y—Y is the position to which the center line of the force is shifted laterally at one of the limits of lateral angling of the coupler and the line Z—Z is the center line of the car. As a consequence of the small angle between the center lines of the force and the car, the transverse or lateral component of the longitudinal force is minimized, eliminating the tendency to derail under the excessive transverse forces which would otherwise be present at the extremes of lateral angling of the coupler.

The embodiment of Figures 3-6 is identical with the first embodiment in its coupler 1 and swivel block 21. However, its yoke 11a is designed to pocket the front cushioning unit 36 of a conventional twin cushion draft gear indicated at 37. To this end, its arms 13a are relatively short and, in addition to being connected at their rear ends by a rear wall or web 12a, are connected intermediate their ends by a bridge or intermediate web 38. The front cushioning unit 36 acts forwardly against a front follower 39 which is normally spaced rearwardly of and has forwardly extending legs 40 straddling the bridge 38 to react against front stop lugs 41.

Separated by the bridge 38 and the yoke 11a from the draft gear 37, the swivel block 21 in this embodiment must have other yieldable or cushioning means to resist angling when it and the coupler 1 angle in unison. This is here applied by cushioning or yieldable means carried by and projecting from the front face 42 of the bridge 38 and here in the form of a rubber ring 43 seating in an annular groove 44 in the bridge 38 and sufficiently wider than the ring 43 to permit lateral flow of the latter under compression. With this construction, the operation of the draft rigging of the second embodiment is the same as that of the first in resisting lateral angling of the coupler beyond predetermined limits, except that the rear face 27 of the swivel block 21 in this embodiment acts against the rubber ring 43 rather than against a draft gear, as it does in the first embodiment, and it is the ring that provides the energy for tending to restore the coupler to centered position.

It has been mentioned that the pivot pin 16 extends through pin holes in the coupler 1, swivel block 21 and yoke 11 of the first embodiment and this is equally true in the case of the corresponding parts of the second embodiment, including its yoke 11a. Were these several pin holes 14, 15 and 23 of substantially the same radius as the pivot pin 16 so as to have a sliding fit therewith, the pin would be subjected to shear under both buffing and draft forces. It is preferred that the buffing forces, which potentially are the more severe, be taken instead through the hinge loops 5 by the flange portions 26 of the swivel block. To this end, the tongue 22, as shown, preferably is spaced from the front wall 9 of the pocket 8 and its pin hole 23 is enlarged, with pin holes 15 in the hinge loops 5 forwardly elongated while those 14 in the yoke 11 or 11a are rearwardly elongated or, alternatively, the pin holes in the hinge loops and yoke may be of slightly greater diameter than the pivot pin 16. In either case, the buffing forces, instead of being taken by the pivot pin, will be received by the head 25 of the swivel block 21 and absorbed by the cushioning means against which the head acts, the draft gear 34 in the first embodiment and the rubber ring 43 in the second.

From the above detailed description, it will be apparent that there has been provided an improved draft rigging whereby a swiveling coupler, while capable of lateral angling to the same extent as a conventional coupler of that type, is limited in its free angling and therebeyond through energizing of an associated cushioning means yieldably resists the force causing the angling. It should be understood that the described and disclosed embodiment is merely exemplary of the invention and that all modifications are intended to be included which do not depart from either the spirit of the invention or the scope of the appended claims.

I claim:

1. In a draft rigging, the combination of a coupler, a yoke swivelly connected thereto, swivel means swivelly connected to said coupler, means on said coupler and swivel means engageable on a predetermined swivelling of said coupler for limiting the relative swiveling movement therebetween, and means acting against said swivel means for yieldably resisting swivelling thereof in unison with said coupler.

2. In a draft rigging, the combination of a coupler, a yoke swivelly connected thereto, swivel means swivelly connected to said coupler, means on said coupler and swivel means engageable on a predetermined swivelling of said coupler for limiting the relative swiveling movement therebetween, and means within said yoke and acting against said swivel means for yieldably resisting swivelling thereof in unison with said coupler.

3. In a draft rigging, the combination of a coupler, a yoke, a swivel block, a pin swivelly connecting said coupler to said yoke and block for relative lateral swiveling therebetween, means on said coupler and block engageable on a predetermined swivelling of said coupler for limiting the relative swiveling thereof, and means acting against said block for yieldably resisting swiveling thereof in unison with said coupler.

4. In a draft rigging, the combination of a coupler having a bifurcated butt, a swivel block having a tongue extending into said bifurcation and flange portions vertically overlapping said butt, a yoke embracing said butt and block, pin means swivelly connecting said coupler to said yoke and block, confronting cylindrical bearing surfaces on said butt and flange portions, said bearing surfaces being coaxial with said pin means and having sliding engagement on relative swiveling of said coupler and block, normally spaced limiting surfaces on said coupler and block engageable on a predetermined swivelling of said coupler for limiting relative swiveling therebetween, and means acting against said block for yieldably resisting swiveling thereof in unison with said coupler.

5. In a draft rigging, the combination of a coupler, a yoke, a swivel block, means swivelly connecting said coupler to said yoke and block, shoulders at opposite sides of said coupler and each confronting and normally spaced from and angularly disposed relative to a shoulder on said block, each of said shoulders being engageable with a confronting shoulder on a predetermined swivelling of said coupler for causing said coupler thereupon to swivel in unison relative to said block, and cushioning means acting against said block for yieldably resisting swiveling thereof in unison with said coupler.

6. In a draft rigging, the combination of a coupler, a yoke, a swivel block, a pin swivelly connecting said coupler to said yoke and block, coradial bearing surfaces on said coupler and block, said surfaces being coaxial with said pin and having sliding engagement during relative swiveling of said coupler and block, shoulders at opposite sides of said coupler and each confronting and normally spaced from and angularly disposed relative to a shoulder on said block, each of said shoulders being engageable with a confronting shoulder on a predetermined swivelling of said coupler for causing said coupler therebeyond to swivel in unison with said block and cushioning means acting against said block for yieldably resisting swiveling thereof in unison with said coupler.

7. In a draft rigging, the combination of a coupler having a shank terminating rearwardly in a pair of vertically spaced hinge loops, a yoke having jaws embracing said loops, a swivel block having a tongue projecting between and flange portions vertically overlapping said loops, a pivot pin extending through said loops, yoke and tongue for swivelly connecting said coupler to said yoke and block, coradial cylindrical bearing surfaces on said loops and flange portions, said surfaces being coaxial with said pin and having sliding engagement on relative swiveling of said coupler and block, shoulders on said coupler and each confronting and normally spaced from and angularly disposed relative to a shoulder on said block, each of said shoulders being engageable with a confronting shoulder on a predetermined swivelling of said coupler for limiting relative swiveling of said coupler and block and causing said coupler and block to swivel in unison therebeyond, and cushioning means within said yoke and acting against a rear face of said block for yieldably resisting swiveling in unison of said coupler and block.

8. In a draft rigging, the combination of a coupler having a shank terminating rearwardly in a pair of vertically spaced hinge loops, a yoke having jaws embracing said loops, a swivel block having a tongue projecting between and flange portions vertically overlapping said loops, a pivot pin extending through said loops, yoke and tongue for swivelly connecting said coupler to said yoke and block, coradial cylindrical bearing surfaces on said loops and flange portions, said surfaces being coaxial with said pin and having sliding engagement on relative swiveling of said coupler and block, substantially flat shoulders on said coupler and directed radially of said pin, each of said shoulders confronting and normally being spaced from and angularly disposed relative to a correspondingly flat and radially directed shoulder on said block engageable on a predetermined swivelling of said coupler for limiting relative swiveling of said coupler and block, each of said shoulders being engageable with a confronting shoulder on a predetermined swivelling of said coupler, and cushioning means within said yoke and acting against a rear face of said block for yieldably resisting swiveling in unison of said coupler and block.

9. In a draft rigging, the combination of a coupler having a shank terminating rearwardly in a pair of vertically spaced hinge loops defining the vertical limits of a pocket therebetween, a yoke having jaws embracing said hinge loops, a swivel block between said jaws and having a tongue projecting into said pocket and flange portions each embracing an end of one of said loops, a pivot pin extending through said loops, jaws and tongue and pivotally connecting said coupler to said yoke and block, confronting coradial bearing surfaces on said loops and flange portions, said bearing surfaces being coaxial with said pin and having sliding engagement on relative swiveling of said coupler and block, spaced arcuate surfaces at confronting ends of said tongue and pocket and substantially coaxial with said pin, shoulders on said coupler and each confronting and normally spaced from and angularly disposed relative to a shoulder on said block, each of said shoulders being engageable with a confronting shoulder on a predetermined swivelling of said coupler engageable on a predetermined swivelling of said coupler for limiting relative swiveling of said coupler and block, and cushioning means within said yoke and acting against a rear face of said block for yieldably resisting swiveling in unison of said coupler and block.

10. In a draft rigging, the combination of a coupler, a yoke, a swivel block, pin means for swivelly connecting said coupler to said yoke and swivel block for swivelling in one direction relative thereto, normally spaced means on said coupler and block engageable on a predetermined swivelling of said coupler relative to said yoke for limiting relative relative swiveling between said coupler and block, and a draft gear pocketed by said yoke and acting against a rear face of said block for yieldably resisting swiveling in unison of said coupler and block.

11. In a draft rigging, the combination of a coupler, a yoke, a swivel block, pin means for swivelly connecting said coupler to said yoke and swivel block for swivelling in one direction relative thereto, normally spaced on said coupler and block for limiting relative swiveling therebetween and causing said coupler therebeyond to swivel in unison with said block, said yoke having a bridge connecting its legs intermediate ends thereof, and cushioning means between and acting against said block and bridge for yieldably resisting swiveling in unison of said coupler and block.

12. In a draft rigging, the combination of a coupler, a yoke, a swivel block, pin means for swivelly connecting said coupler to said yoke and swivel block for swivelling in one direction relative thereto, normally spaced means on said coupler and block for limiting relative swiveling therebetween and causing said coupler therebeyond to swivel in unison with said block, said yoke having a bridge connecting its legs intermediate ends thereof, and cushioning means carried by and projecting from a front face of said bridge and reacting against a rear face of said block for yieldably resisting swiveling in unison of said coupler and block.

13. In a draft rigging, the combination of a coupler, a yoke swivelly connected to said coupler for swivelling in one direction thereto, a swivel block swivelly connected to said coupler for swivelling in said one direction relative thereto, normally spaced means on said coupler and block engageable on a predetermined swivelling of said coupler relative to said yoke for limiting relative swivelling between said coupler and yoke and causing said coupler therebeyond to swivel in unison with said block, and cushioning means pocketed by said yoke and acting against said block for yieldably resisting swivelling in unison of said coupler and block.

References Cited in the file of this patent

UNITED STATES PATENTS

| | | |
|---|---|---|
| 1,930,679 | Haseltine | Oct. 17, 1933 |
| 1,952,284 | Richards | Mar. 27, 1934 |
| 2,212,843 | Metzger | Aug. 27, 1940 |
| 2,235,194 | Bazeley | Mar. 18, 1941 |
| 2,254,302 | Metzger | Sept. 2, 1941 |
| 2,645,362 | Spence | July 14, 1953 |